United States Patent [19]

Garnett

[11] 4,326,619
[45] Apr. 27, 1982

[54] RELATING TO BEARING ASSEMBLIES FOR USE IN CONVEYOR ROLLERS

[76] Inventor: David M. Garnett, Thorpe Arch Trading Estate, Wetherby, Yorkshire, England, LS23 7BL

[21] Appl. No.: 107,199

[22] Filed: Dec. 26, 1979

[30] Foreign Application Priority Data

Sep. 7, 1979 [GB] United Kingdom ............... 31142/79

[51] Int. Cl.³ ............................................. B65G 37/00
[52] U.S. Cl. ...................................... 193/37; 308/187
[58] Field of Search ........................... 193/35 R–35 S, 193/37; 308/18, 20, 187, 187.1, 187.2; 301/5.7; 198/780, 842; 277/133

[56] References Cited

U.S. PATENT DOCUMENTS 2,141,810  12/1938  Carroll ................................. 308/20
3,362,760   1/1968  Sernetz ........................... 308/187.1
3,957,147   5/1976  Specht ............................... 308/187

Primary Examiner—Robert B. Reeves
Assistant Examiner—Gene A. Church
Attorney, Agent, or Firm—David A. Jackson

[57] ABSTRACT

The invention provides roller element bearings for roller conveyors. The bearings fit into the ends of hollow sleeve bodies to define the rollers of the conveyor. The bearings are designed to prevent the ingress of water through the bearings into the interior of the sleeve bodies, because collection of liquid in these bodies is unhygienic in food factory applications. The bearings are designed to act as water seals by the design of labyrinth seals between the inner and outer races of the bearings in that the labyrinth gaps are designed to allow outflow of liquid from the bearings, The clearances are not made so large as to allow excessive inflow of liquid into the bearing. The labyrinth seal therefore acts in two ways. It limits inflow of liquid into the bearing and also allows outflow of that liquid from the bearing to prevent accumulation of liquid in the bearing.

5 Claims, 5 Drawing Figures

RELATING TO BEARING ASSEMBLIES FOR USE IN CONVEYOR ROLLERS

This invention relates to bearing assemblies for use in conveyor rollers.

Conveyor rollers are used extensively in industry when it is desired to provide a transportation system for products, boxes or the like extending for example between locations in a factory of from a despatch location to a location from which goods to be shipped can be loaded in to a transportation vehicle. The rollers in fact combine to define the transportation surface or decking and these conveyor roller systems can be used for the transportation of large and small articles and objects alike, although we are primarily concerned with conveyor roller systems for the transportation of manually handleable items such as frozen chickens, loaves of bread, or boxes of articles such as tins of beans, and so on.

A conveyor roller essentially is a relatively simple article and comprises normally a sleeve body in the ends of which are located bearing assemblies. Means defining a spindle supported by a surrounding frame engages in the bearing assemblies whereby the sleeve body is free to rotate relative to the axis defined by the spindle.

Although these rollers essentially are simple in nature, not much attention has been given to their design, and in fact the bearing assemblies which are still extensively used throughout the world are somewhat primitive and inefficient. For example, it is known to provide bearing assemblies which are simply plastic or wooden blocks, the spindle means locating directly in a bore in the wooden block or plastic block in sliding relationship therewith. Other known arrangements use roller bearings in the bearing assemblies, but these roller bearings traditionally have been constructed of steel but such bearings have been and are liable to corrosion, as frequently the conveyor rollers must work in corrosive environments, at the very least where water and air are present, which gives rise to rusting of the bearings and their eventual siezure or dramatic reduction in their efficiency. It is imperative that the conveyor rollers be extremely free running, especially where they are used in a gravity conveyor roller systems in which the decking is inclined, and the goods moved along the roller decking by virtue of gravity. The discussed prior art roller systems have not been directed to the needs of and problems associated with conveyor roller systems.

Furthermore, in conveyor systems the demand for the bearings of each roller to be high accuracy machine comonents is not as great as in other engineering applications and consequently I have in fact devised bearing assemblies for conveyor rollers which are constructed from plastics material, and I have found that the tolerances can be reasonably generous compared with precision made steel roller bearings, without any deleterious effect on the operation of the bearings, and indeed in some case the generous tolerances enhance the operation of the roller as they make it run freer.

The ability of the roller to run freely is in fact of prime importance in a conveyor roller system, and care must be taken to ensure that the bearing assemblies at the ends of the sleeve body are not loaded axially one relative to the other, either when the roller is assembled or when it is placed in position in the conveyor system frame. Considering firstly the conveyor system frame mounting, if the roller bearing is wedged into the frame, and the bearing assemblies at the ends of the sleeve body are roller bearings having inner and outer races, if the frame for the example bears upon the inner races of the end bearings and urges them axially together, there will be a loading axially of the roller on the rolling elements on the bearings, preventing free-running of the roller bearing assembly on the roller elements. Equally, if the spindle means is a long spindle which extends through the end bearings, if the fit between the spindle means and the inner races, for example, is so much of an interference fit that insertion of the spindle means requires considerable effort, this can in fact impose a similar type of axial loading on the inner races, and hence on the rolling elements which the result that optimum free running of the sleeve body is not achieved. It is desirable in fact that when the roller is fitted in the roller transport system, the sleeve body should be capable of a limited degree of free axial movement relative to the spindle means. This is provided by ensuring that the bearing assemblies are a sliding fit on the spindle, means being provided to ensure that the degree of sliding of the bearings on the spindle means is limited.

Because these systems are being used to a much greater extent in the food industry, much attention has been given to whether or not the use of these conveyor rollers, in all of their forms, gives rise to any hygiene problems. In fact they do give hygiene problems in that water and other liquids for example used for the washing down of the system, or dropping from the products carried by the system, tends to collect inside the sleeve bodies wherein it remains undetected, and from which it does not evaporate rapidly, leading in the final analysis to bacterial growth which is totally unacceptable in a food factory. I have given considerable effort and throught to the overcoming of the problem of the ingress of water into the sleeve body in order to overcome the hygiene problems associated with the roller transport systems of the type in which the invention can be applied, and my invention is concerned with the provision of a bearing assembly for a sleeve body of a conveyor roller of a transport system, by which the aforesaid problem concerning the ingress of liquid can be avoided, or substantially eliminated.

In accordance with the invention, my bearing assembly comprises an inner race and an outer race of which one is adapted to be in operative connection with a sleeve body, whilst the other is for operative connection with a spindle means, and the inner and outer races co-operate to define a labyrinth seal therebetween of which the labyrinth passage is dimensioned to resist the inflow of water, but is not so small as to prevent the outflow of water, said labyrinth seal being located at a greater diameter than the pitch circle diameter of the rolling elements of the bearing.

The inventive concept might be summarised by stating that I have dimensioned the labyrinth seal, not in the fashion as would be obvious to provide a water seal by making the labyrinth passages as small in width as possible, but by increasing that width to provide an adequate outflow arrangement at the lower side of the bearing, keeping in mind that the bearing will in fact be disposed with its axis at rotation more or less horizontal. The labyrinth seal is therefore used in a different fashion from the manner in which it is traditionally used, in that in the invention the labyrinth seal enables the inflow of a certain amount of water and the seal spacing is not minimised, but the invention provides the advantage that the labyrinth seal is not so small as to prevent the outflow of the water at the lower end of the bearing.

It should be mentioned that the spindle means may be a single spindle for each roller, and extending between spaced supports of the frame and through both bearing assemblies, or the spindle means may be defined by separate stub shafts which are respectively supported in said spaced frame members, but which are associated with the respective bearings, and do not extend completely through the roller.

Also according to the invention there is provided a roller conveyor comprising a plurality of conveyor rollers, each roller comprising a sleeve body receiving at the respective ends bearing assemblies by which the roller is supported in a conveyor frame by spindle means engaging said bearing assemblies, each bearing assembly comprising a roller bearing having an inner race and an outer race of which one is engaged in the adjacent end of the sleeve body, whilst the other is engaged by the spindle means, and of each bearing, the inner and outer race co-operate to define a labyrinth seal therebetween to the outside of the bearin having regard to the position of the bearing in relation to the sleeve body, and of which the labyrinth passage is dimensioned to resist the inflow of water, but is not so small as to prevent the outflow of water, when the conveyor is washed, said labyrinth seal being located at a greater diameter than the pitch circle diameter of the rolling elements of the bearing.

The invention can be applied to driven rollers as well as gravity rollers.

An embodiment of the present invention will now be described, by way of example, with reference to the accompanying drawings, wherein FIG. 1 is a perspective view of part of a roller conveyor transport system;

Figure 1:
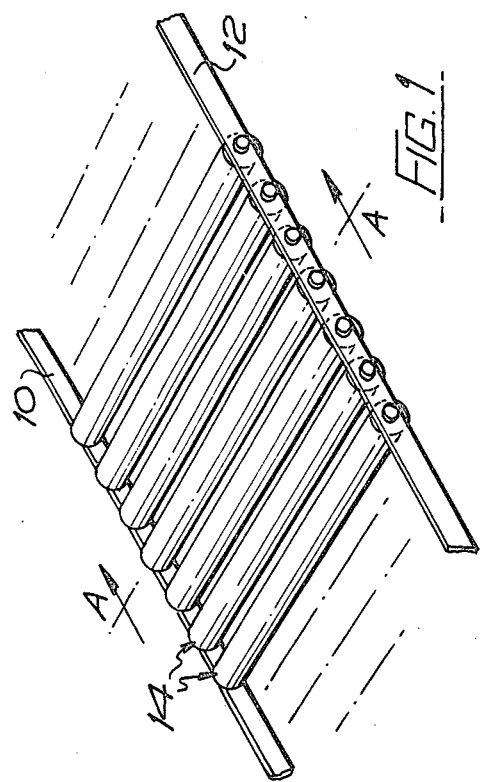

Referring to the drawings, in FIG. 1 there is shown a section of a simple roller conveyor transport system comprising a pair of parallel side frame members or bars 10, 12, between which extend, in parallel fashion, the conveyor rollers 14. It should be mentioned that the arrangement illustrated is an extremely simple version of a roller conveyor transport system, and it has been illustrated in simplified fashion for the purpose of explanation. In practice these systems will be much more complicated in having curves, parallel rows of rollers, and so on. The present invention is however concerned with the bearing structure, and not with the particular conveyor layout.

Figure 2:
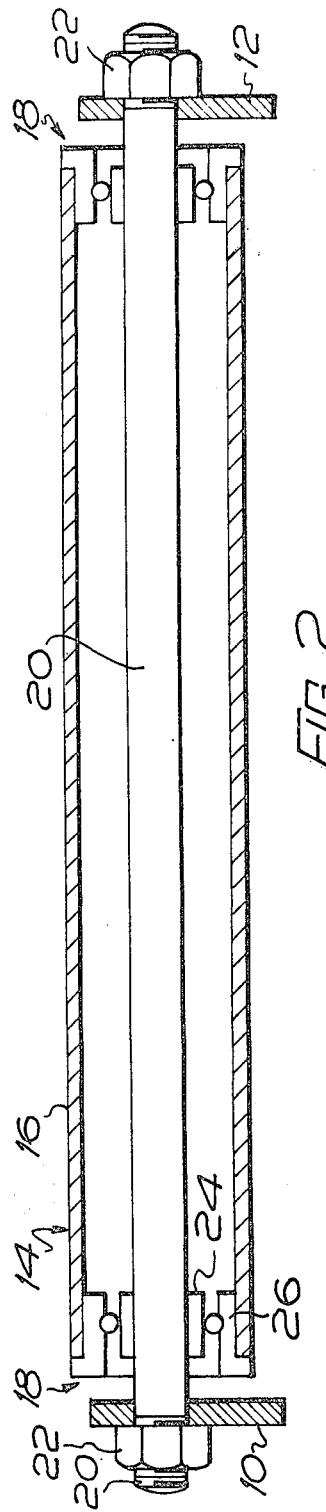
FIG. 2 is a sectional elevation, taken on the line A-A in FIG. 1 showing detail of a roller of which several are shown in FIG. 1, FIG. 2 being diagrammatic in the bearing assembly constructional details.

Each of the rollers 14 is diagrammatically indicated in FIG. 2, and will be seen to comprise a sleeve body 16 in the ends of which are press fitted bearing assemblies 18. The bearing assemblies are on a central spindle 20 which passes through suitable apertures in the frame members 10 and 12, the spindle 20 being shown as anchored in fixed position by means of end nuts 22 which engage threaded ends of the spindle 20.

Figure 3:
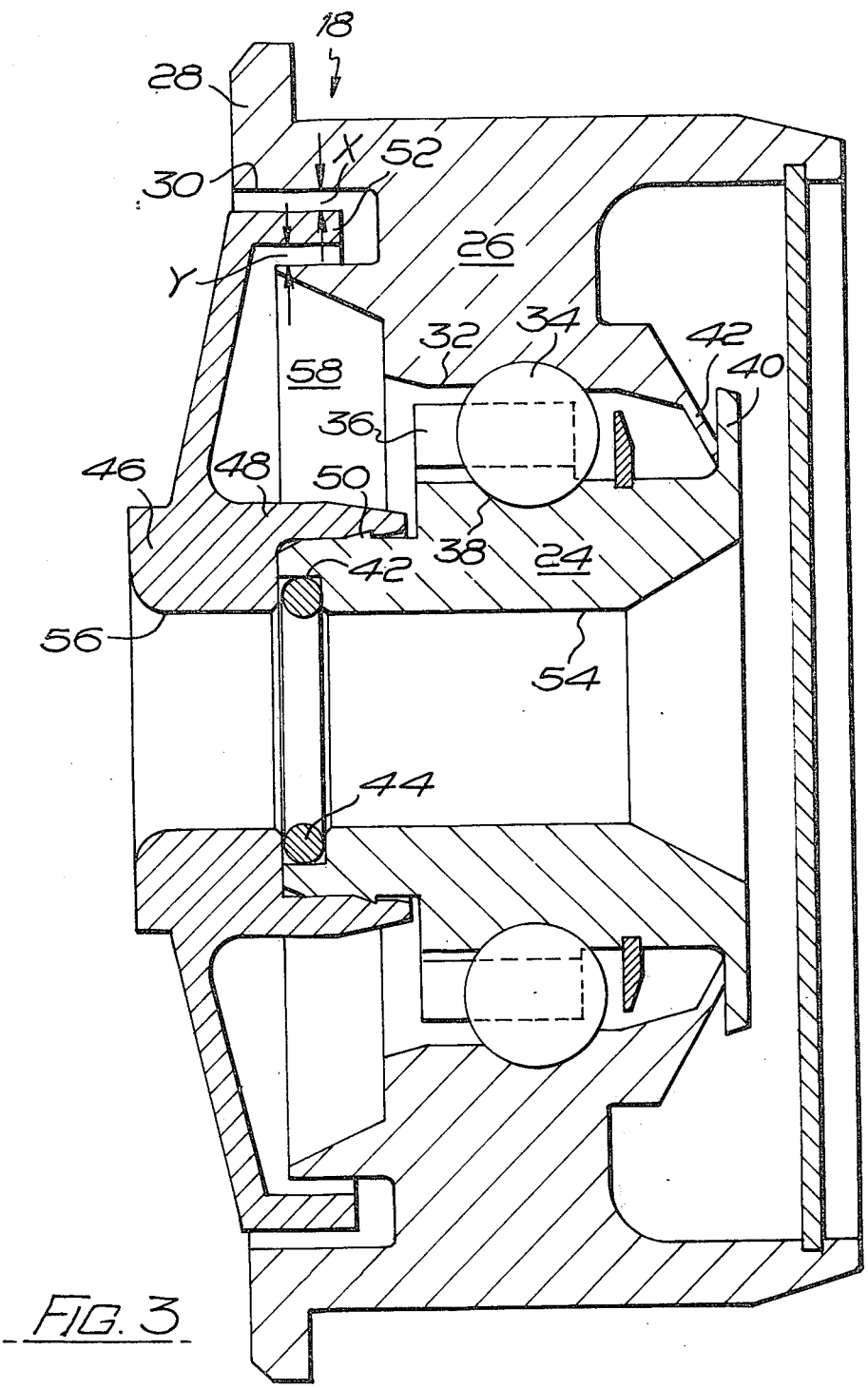
FIG. 3 is a sectional elevation showing a bearing assembly in accordance with the invention, and for use in the roller illustrated in FIG. 2.

Each of the bearing assemblies 18 is shown in FIG. 2 to comprise an inner race 24 engaged on the spindle 20 and an outer race 26 over which the sleeve body 16 is frictionally engaged. In FIG. 2, the bearing assemblies are shown in much simplified form, but FIG. 3 shows in detail the construction of the bearing assembly 18 located at the left hand of the roller shown in FIG. 2. The bearing 18 at the right hand of the roller is of identical construction.

Referring now to FIG. 3, the bearing assembly 18 is shown in detail, and it will be seen that the outer bearing race 26 is provided with a flange 28 against which the sleeve body 16 can abut when it is friction fitted thereon. Additionally, towards the outside of the bearing, the outer race 26 is provided with a labyrinth cavity 30. An outer race bearing surface 32 is engaged by the ball rolling elements 34 of the bearing assembly, said bearing elements 34 being held in a correct space disposition by means of a cage 36.

The inner race 24 is provided with a ball race surface 38 which is engaged by the said balls 34, and is also provided at its inner end with an outwardly directed flange 40 which is engaged by a conical lip seal 42 formed integrally in the outer race 26.

At its outer end, the inner race 24 is provided with a shoulder 43 in which is engaged a rubber O-ring seal 44, the seal 44 being prevented from falling from the bearing assembly by means of an end cap 46. The end cap 46 has an inwardly projecting ring 48 which snaps over a locating ring of the inner race, the engagement being retained by means of the conical projecting ring 50 on the inner race engaging a corresponding groove on the inner surface of ring 48.

The cap 46 has a labyrinth sealing ring 52 which lies in the labyrinth groove 30 of the outer race with clearance of particular dimensions as will be explained.

It will be noticed that the inner race 24 has a bore 54 of a suitable size to receive the spindle 20, and also the cap 46 has a bore 56 which is identical in size to and co-axial with the bore 54, so that the spindle can pass through the bearing assembly. It is to be mentioned that the O-ring seal 44 has an inner diameter which is slightly less than the common bore 56/54, and the spindle 20 is adapted to be received in the common bore 56/54 with clearance, so that in actual fact the seal between the spindle 20 and the bearing assembly along the bore 56/54, is in fact by contact between the O-ring seal 44 and the spindle 20 and not between the bore surfaces 56/54 and the spindle 20. This constitutes a significant departure in construction in a bearing assembly of this type, and also enables the bearing assembly to have the necessary axial freedom to float on the spindle as referred to herein, which is important for the prevention of pre-loading of the respective bearings 18 in a roller, which gives rise to friction running of the outer sleeve body 16. It will be noted that there is in fact no relative rotation between the spindle 20 and the inner race 24 and its end cap 46, and therefore the seal 44 should provide an effective means for preventing the ingress of water into the inside of the sleeve body through either bearing assembly 18 along the surface of spindle 20.

The labyrinth gap has been referred to herein, and by this gap is meant the dimension such as dimension X or dimension Y between the relatively rotating surfaces of the labyrinth groove 30 and the labyrinth ring 52. It is also important that the labyrinth diameter be greater than the pitch circle diameter of the balls 34 for a purpose which will be clear from the following.

The bearing assembly is in use located in the disposition shown in FIG. 3, and when liquid falls in the bearing assembly or is sprayed thereonto for the purposes of washing same, the liquid will flow into the bearing assembly through the gaps X and Y, and will tend to fill the interior of the bearing assembly for example in cavity 58, and around the balls and ball cage, and finally in the vicinity of the seal 42 and the flange 40. The liquid would accumulate were it not for the fact that the dimensions X and Y which, although shown at the top of the bearing assembly, of course also exist at the bottom of the bearing assembly as the components are rotary, and these clearances are designed such as to allow the liquid to run out of the bearing assembly. The unit is therefore designed to resist ingress of water and other liquids, but is not made so narrow that the egress of water out of the bottom of the bearing through the same labyrinth gaps is prevented. From a practical point of view, I have achieved excellent results in the case where the diameter of the labyrinth ring 52 is of the order of 47 mm, when the X and Y spacings are made of the order of 2 mm, and preferably in the range 1.7 to 2.3 mm. When the bearing was tested with the labyrinth gaps X and Y of the order of 1.3 mm. the test liquid flowed into the bearing, but could not escape at the bottom end, and therefore filtered into the interior of the sleeve 16.

The seal arrangement 40 and 42 without the labyrinth seal was found not to be the complete answer for sealing the bearing, for the reason that the bearing illustrated, being completely of plastics material, except for the balls 34 which were of stainless steel to resist corrosion, and the O-ring seal 44 which was of rubber, had considerable tolerances in the interfitting of the parts, and in fact it is found that with the fitting of the sleeve body to the outer race 26, if the end of the sleeve body is not in a plane exactly at right angles to the sleeve body axis, and it is unusual to achieve such accuracy, because the sleeve bodies are usually cut from extruded plastic pipe, and there tends to be a loading on the outer race 26 making it slightly tilted relative to the inner race 24, and this tilting results in the seal 40/42 becoming less than perfect. An important feature therefore is in fact the design of the labryinth seal as has been explained herein.

The bearing assemblies described are for plugging into the ends of bearing sleeves, but it is appreciated that this invention could well be applicable in other applications. The bearing assembly can be made cheaply when the parts are moulded from plastics material as described, and assembly of the roller is facilitated by the fact that the spindle 20 sealingly engages only on the O-ring seal 44. The said bearings could be used with stub axles instead of a through axle as indicated in FIG. 2.

Figure 4:
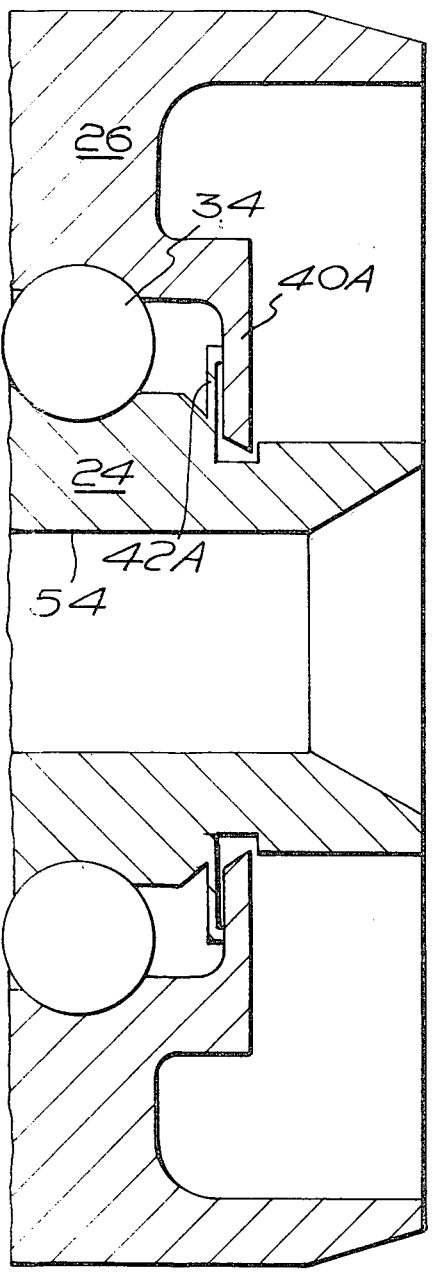
FIGS. 4 and 5 are sectional elevations similar to FIG. 3, but showing only parts of bearing assemblies according to two further embodiments of the invention.
Figure 5:
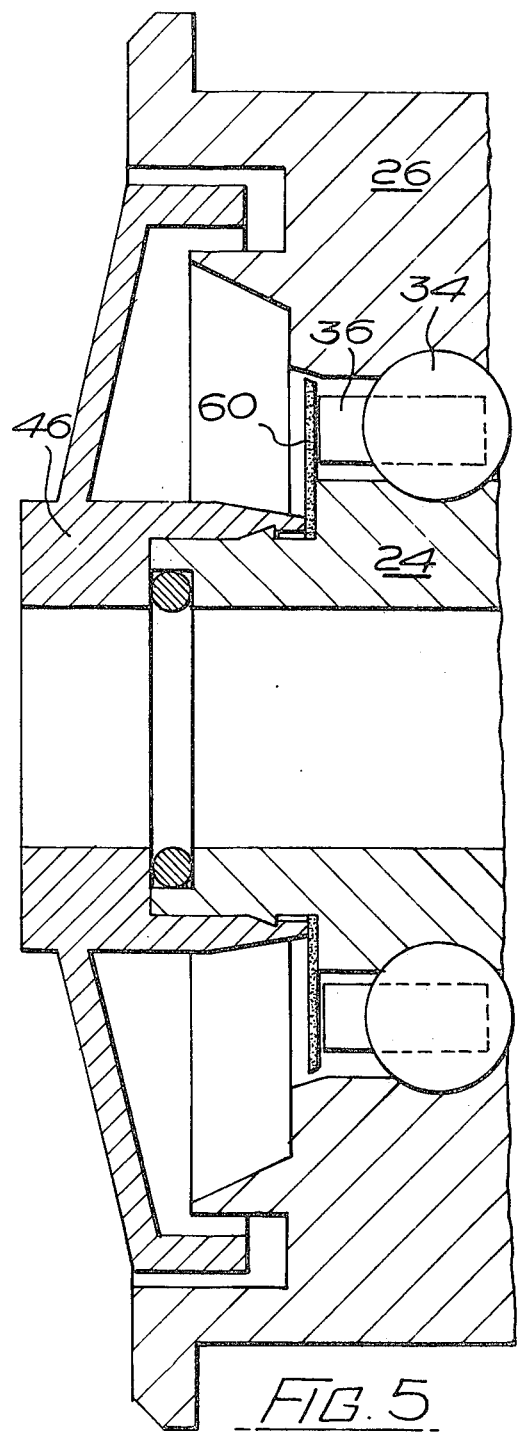

Referring briefly to FIGS. 4 and 5, of the parts illustrated, those which have already been described in relation to FIG. 3, carry the same reference numerals.

In the arrangement illustrated in FIG. 4, the outer race 26 is provided with a flange seal 40A, whilst the inner race 24 is provided with the sealing lip 42A, which is resiliently engaged on the sealing flange 40A, and which is outwardly projecting to prevent the passage of liquid into the interior of the sleeve body.

In the modification shown in FIG. 5, a sealing disc 60 is arranged to be trapped between the end cap 46 and the inner race 24 as shown, in order to more or less completely cover the gap between the races 24 and 26 housing the ball race and balls 36 and 34. This sealing ring 60 acts to limit the ingress of liquid into the interior of the sleeve body.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A bearing assembly for a roller comprising an inner race, an outer race and a plurality of rolling elements between the inner and outer races, one of said inner and outer races being adapted to be in operative connection with a sleeve body, whilst the other is for operative connection with a spindle means, and wherein there is an annular groove in one of the inner and outer races and an annular rim on the other of said inner and outer races which locates in said groove but does not contact the surfaces defining said groove so as to define a labyrinth seal having a U-shaped labyrinth passage dimensioned to resist the inflow of water, said labyrinth seal being located at a greater diameter than the pitch circle diameter of the rolling elements of the bearing, wherein said annular groove in one of said races is defined by two annular surfaces generally parallel to the axis of rotation of the bearing and a base surface which lies at right angles to said axis, and the said annular rim extends axially into said groove.

2. A bearing assembly according to claim 1, wherein the diameter of said annular rim is of the order of 47 mm and the minimum and maximum radial sizes of the labyrinth passage are 1.7 mm and 2.3 mm respectively.

3. A bearing assembly according to claim 1, wherein the labyrinth seal is to one side of the rolling elements of the bearing and to the other side of said elements there is a lip seal contact between extensions of the inner and outer races.

4. A roller conveyor comprising a plurality of conveyor rollers, each roller comprising a sleeve body receiving at the respective ends bearing assemblies by which the roller is supported in a conveyor frame by spindle means engaging said bearing assemblies, each bearing assembly comprising a roller bearing having an inner race, an outer race and a plurality of rolling elements between the inner and outer races, one of said inner and outer races being engaged in the adjacent end of the sleeve body, whilst the other is engaged by the spindle means, and of each bearing there is an annular groove in one of the inner and outer races and an annular rim on the other of said inner and outer races which locates in said groove but does not contact the surfaces defining said groove so as to define a labyrinth seal to the outside of the bearing having regard to the position of the bearing in relation to the sleeve body, and having a U-shaped labyrinth passage dimensioned to resist the inflow of water but not so small as to prevent the outflow of water, when the conveyor is washed, said labyrinth seal being located at a greater diameter than the pitch circle diameter of the rolling elements of the bearing, wherein, of each bearing of each roller, said annular groove is defined by two annular surfaces generally parallel to the axis of rotation of the bearing and a base surface which lies at right angles to said axis, and the said annular rim extends axially into said groove.

5. A roller conveyor according to claim 4, wherein the diameter of said annular rim is of the order of 47 mm and the minimum and maximum radial sizes of the labyrinth passage are 1.7 mm and 2.3 mm respectively.

* * * * *